United States Patent [19]

Fukasawa et al.

[11] 4,252,078
[45] Feb. 24, 1981

[54] METER HAVING ILLUMINATED POINTER

[75] Inventors: Noburu Fukasawa, Kamakura; Masao Ishikawa, Yokohama, both of Japan

[73] Assignee: Nissan Motor Company, Limited, Yokohama, Japan

[21] Appl. No.: 26,970

[22] Filed: Apr. 4, 1979

[30] Foreign Application Priority Data

Apr. 5, 1978 [JP] Japan .................... 53/44477[U]

[51] Int. Cl.³ ............................. G01D 11/28
[52] U.S. Cl. ............... 116/288; 116/DIG. 5; 116/DIG. 6
[58] Field of Search ......... 116/288, 287, 286, DIG. 5, 116/DIG. 6, DIG. 36, 256, 257; 362/26, 2.7, 382

[56] References Cited

U.S. PATENT DOCUMENTS

| 2,117,756 | 5/1938 | Douglas | 362/382 |
|---|---|---|---|
| 2,328,485 | 8/1943 | Ott | 116/288 |
| 2,715,886 | 8/1955 | Smith | 116/288 |
| 2,874,268 | 2/1959 | Martin | 116/286 |

Primary Examiner—Gerald Goldberg
Assistant Examiner—Denis E. Corr
Attorney, Agent, or Firm—Schwartz, Jeffery, Schwaab, Mack, Blumenthal & Koch

[57] ABSTRACT

A meter useful in vehicles, having a dial plate, a swivel pointer made of a transparent material and an electrical light source such as a miniature light bulb to illuminate the pointer by light transmitted therethrough. A root portion of the pointer is bored to provide therein a cavity, and a hood member mounted on the dial plate has a shade portion above the cavity. The light source is attached to the hood member so as to be disposed in the cavity in the pointer. The hood member is detachably secured to the dial plate by a set of metal connectors which serve also as electric connectors to establish a circuit for energizing the light source.

6 Claims, 6 Drawing Figures

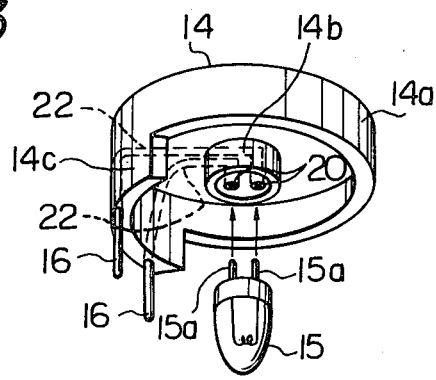
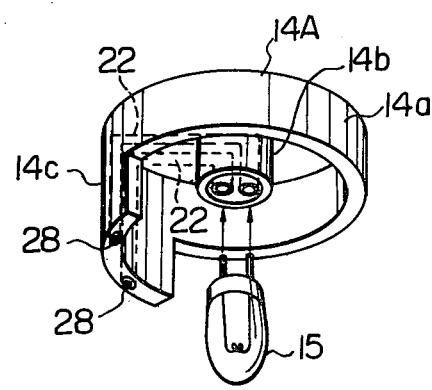
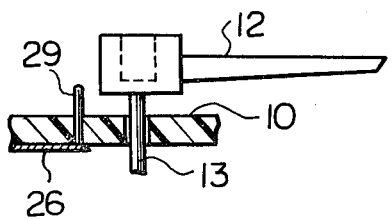
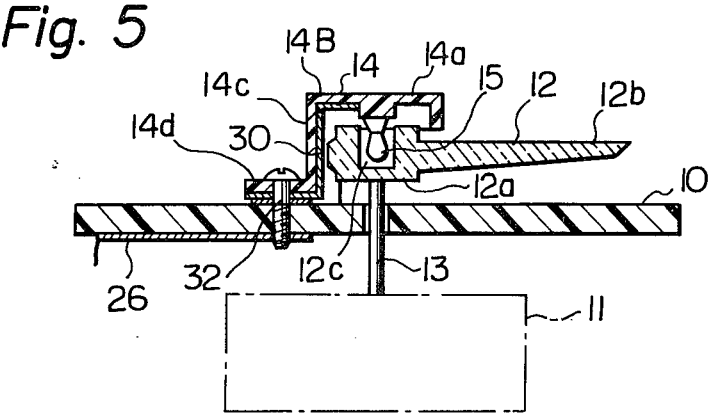

METER HAVING ILLUMINATED POINTER

BACKGROUND OF THE INVENTION

This invention relates to meters useful in vehicles, and more particularly to a meter of the type having a swivelling pointer made of a transparent or translucent material and illuminated by light transmitted therethrough.

In regard of meters for vehicles and particularly meters for installation on an instrument panel in automobiles, various methods have been proposed to provide a radiant or illuminated indicator point.

In one of these methods, the dial plate of the meter is provided with a light source to illuminate a pointer, which is made of a transparent or translucent material, by introducing reflected rays of light into a root portion of the pointer. In this method, however, only a fraction of light emitted from the light source is utilized to illuminate the pointer, so that the brightness of the pointer is insufficient unless use is made of a large light source. Where the light source is a light bulb, the difficulty of disassemblage for replacement of a broken light bulb becomes another disadvantage of this method.

Also it has been proposed to dispose a light source in a root portion of a transparent or translucent pointer. However, this method has encountered difficulties in mechanically supporting the light source and in supplying a current to the light source. In other words, meters according to this method are still unsatisfactory both as regards their production and in maintainability.

SUMMARY OF THE INVENTION

It is an object of the present invention to provide an improved meter of the type having an illuminated pointer, which meter is suitable for use in vehicles and is superior in producability, maintainability, brightness of the pointer relative to the capacity of the light source, and simpleness and smallness of a mechanism for supporting and energizing the light source.

A meter according to the invention comprises a dial plate whose front side provides a dial face, a pointer which is made of a material which is pervious to light and has a root portion, which is formed with a cavity opening in a front surface, and an elongate pointer portion extending from the root portion and a rotatable shaft means for supporting the root portion of the pointer such that the front surface of the root portion becomes remotest from the dial face and that the pointer can swivel over the dial face. This meter further comprises a hood member substantially impervious to light, which is mounted on the dial plate and has a cap-like shade portion so shaped and positioned as to be spaced from and cover, the front surface of the root portion of the pointer and a support portion extending from the shade portion to the dial face, and an electrical light source which is attached to the shade portion of the hood member so as to be disposed in the cavity in the root portion of the pointer. The hood member is provided with an electrical circuit including the light source and is detachably secured to the dial plate by a set of electrically conducting connectors such that the electrical circuit of the hood member is connected by these connectors to an electrical feeder circuit provided to the rear side of the dial plate.

For example, a pair of metal pins partially inserted into the support portion of the hood member and a pair of sleeve-like terminals embedded in the dial plate constitute the aforementioned connectors.

BRIEF DESCRIPTION OF THE DRAWINGS

FIG. 3 is a perspective view of a hood member in the embodiment shown in FIGS. 1 and 2;

FIG. 4(A) is a perspective view illustrating a slight modification of the hood member of FIG. 3;

FIG. 4(B) is a cross-sectional view illustrating a slight modification of the dial plate in FIG. 2; and FIG. 5 shows another modification of the hood member in a sectional view corresponding to FIG. 2.

DESCRIPTION OF THE PREFERRED EMBODIMENTS

Figure 1:
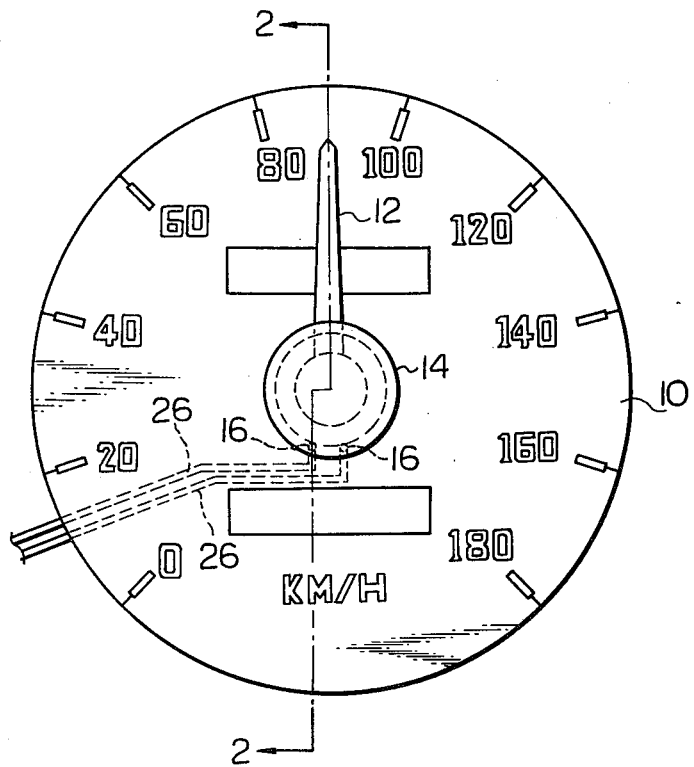
FIG. 1 is a front view of a speedometer embodying the present invention.
Figure 2:
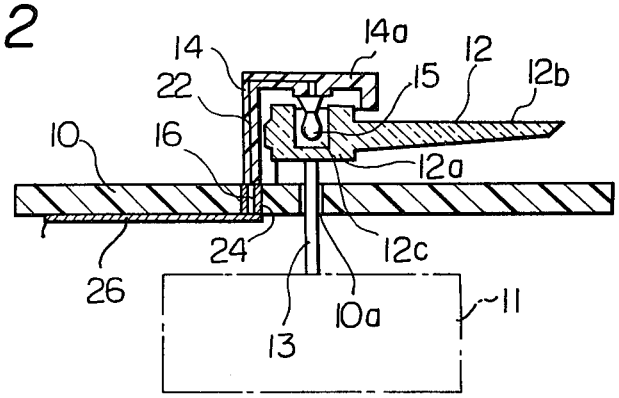
FIG. 2 is a sectional view taken along the line 2—2 of FIG. 1.

In FIGS. 1 and 2, the present invention is embodied in an automotive speedometer having a usual dial plate 10 which may be made of any suitable material. An indicator pointer 12 of this speedometer is made of a transparent material such as acrylic resin, or a translucent material, and consists of a generally cylindrical root portion 12a and an elongate pointer portion 12b extending radially outward from the cylindrical periphery of the root portion 12a. A spindle 13 extends normal to the dial plate 10 from a movement part 11 of the speedometer and passes through a hole 10a of the dial plate 10 such that one end of the spindle 13 reaches a position somewhat above the front face, i.e. dial, of the dial plate 10. At this end, the spindle 13 fixedly supports thereon the cylindrical root portion 12a of the pointer 12 such that the root portion 12a is substantially in axial alignment with the spindle 13. Accordingly the pointer 12 swivels, with the center of the root portion 12a as the axis of swivelling, in a plane parallel to the front face of the dial plate 10 as the spindle 13 is rotated about its axis.

From an upper end face (an end face remoter from the dial plate 10), the cylindrical root portion 12a of the pointer 12 is bored so as to provide therein a generally cylindrical bore 12c, which is substantially coaxial with the spindle 13 and terminates at a short distance from the other end face (closer to the dial plate 10) of the root portion 12a.

Mounted on the front face of the dial plate 10 is a hood member 14, which has a cap-like portion 14a positioned at a short distance above the upper end face of the root portion 12a of the pointer 12 and a support portion 14c extending from a peripheral region of the cap-like portion 14a to reach the dial plate 10. The hood member 14 is made of an opaque (or opaquely colored) and electrically insulating material and is detachably attached to the dial plate 10 as will be described hereinafter. The cylindrical cap-like portion 14a is larger in diameter than the root portion 12a of the pointer 12 but smaller in breadth than the dial plate 10 and is formed with a socket portion 14b on its inside facing the aforementioned cylindrical bore or chamber 12c. As a light source to illuminate the pointer 12, a miniature light bulb 15 is fitted into this socket portion 14b. The dimensions of the chamber 12c and the position of the socket 14b are such that the light bulb 15 is almost entirely received in the chamber 12c without touching the side and bottom surfaces of the chamber 12c.

As shown in FIG. 3, the cap-like portion 14a of the hood 14 has a cylindrical peripheral wall surrounding the socket 14b with a radial distance therebetween and extending towards the dial plate 10. The cylindrical wall is short enough to allow free swivelling of the pointer 12 but long enough to shade the light travelling in lateral directions from the light bulb 15. Circumferentially a part of the cylindrical wall of the cap-like portion 14a is extended to serve as the aforementioned support portion 14c. In this embodiment the light bulb 15 has a pair of terminal pins 15a, and the socket 14b includes a pair of sleeve-like female terminals 20. A pair of metal pins 16 are partially inserted into the support portion 14c of the hood 14 so as to protrude from the lower end of the support portion 14c, and leads 22 are embedded in the hood 14, or extended on the inner surfaces of the hood 14, to connect the terminals 20 to the pins 16.

Referring again to FIGS. 1 and 2, a pair of sleeve-like female terminals 24 are embedded in the dial plate 10 in a region where the support portion 14c of the hood 14 comes into contact with the dial plate 10. The pins 16 of the hood 14 are designed and arranged so as to fit tightly into the terminals 24 in the dial plate 10. A pair of leads 26 to connect the terminals 24 to an external feeder circuit (not shown) extend along the rear surface of the dial plate 10. By way of example, the technique of printed circuit may be utilized to provide the leads 26 to the dial plate 10.

As will be understood from the foregoing description, the hood member 14 serves both as a light bulb support member and as a shade member to avoid illumination of unnecessary areas by the light bulb 15. The pins 16 inserted into the hood 14 serve both as electrical terminals and as mechanical connectors to detachably attach the hood 14 to the dial plate 10. In assemblage, the light bulb 15 is fitted to the socket 14b and then the hood 14 is attached to the dial plate 10. When the light bulb 15 is lighted upon establishment of electrical connection, the pointer 12 is illuminated by the light transmitting radially therethrough. A lower surface (facing the dial plate 10) of the pointer portion 12b of the pointer 12 is made to reflect light either by opaquely painting this surface or by rendering this surface uneven so as to cause diffused reflection. Accordingly, the pointer portion 12b shines brightly so long as the light bulb 15 is lighted. If need arises, for example, for replacement of the light bulb 15, the hood member 14 can be detached from the dial plate 10 simply by pulling up the hood 14.

It will be understood that both the shape of the hood member 14 and the manner of detachable attachment of the hood 14 to the dial plate 10 can be modified in various ways. The light source 15, too, is not limited to a light bulb but may alternatively by an electronic device such as a light emitting diode. The root portion 12a of the pointer 12 may have a shape different from a cylindrical shape.

In FIG. 4(A) a modified hood member 14A has a pair of sleeve-like terminals 28 embedded in the support portion 14c in place of the pins 16 in the hood 14 of FIG. 3. In this case the dial plate 10 is provided with a pair of pin terminals 29, as shown in FIG. 4(B), in place of the sleeve-like terminals 24 in FIG. 2. This hood 14A, too, can be attached to the dial plate 10 by a single action with simultaneous establishment of mechanical and electrical connection and, if necessary, can be detached simply by pulling up it.

In FIG. 5, a differently modified hood member 14B has a flange 14d at the lower end of the support portion 14c, and a pair of leads 30 extend from the socket 14b to the lower surface of this flange 14d. The flange 14d is formed with two through holes (no numeral), and the dial plate 10 is formed with two tap holes (no numeral) respectively in axial alignment with the holes in the flange 14d. The hood member 14B is secured to the dial plate 10 by fitting set screws 32 into the tap holes in the dial plate 10 through the holes in the flange 14d. The leads 26 on the rear side of the dial plate 10 and the leads 30 in the hood 14B are arranged so as to be electrically connected with each other by the set screws 32. Thus, the set screws 32 in FIG. 5 serve both as mechanical connectors and as electric terminals or connectors.

The advantages of an arrangement according to the invention are summarized as follows.

(1) Since the light source is located in a root portion of the pointer, the light is efficiently utilized to illuminate the pointer, meaning that the pointer 12 can be brightened with high luminous intensity by means of a relatively small light source.

(2) Since the assemblage of the light source and the hood member with the dial plate can be accomplished very easily, a great improvement can be produced on the manufacture of the meter.

(3) Since the hood member and the light source can easily be detached from the dial plate without touching the pointer, the replacement of the light source, and also the replacement of the pointer, can be done very easily and quickly.

(4) Since the connection of the hood member to the dial plate is made by simply and small-sized connectors such as pins or set screws and accordingly the support portion of the hood can be made small in size, the hood as a whole can be made so small in size that the presence of the hood on the dial plate offers little obstruction to an attractive design of the indicator part of the meter.

(5) Since there is no need for supporting the hood member from marginal regions of the dial plate, the hood member does not cover important regions of the dial plate. In a combined speedometer embodying the invention, the hood member does not cover any part of the indicator(s) of an odometer and/or a trip meter.

Of course the present invention is applicable to a variety of meters other than speedometers: some additional examples are tachometers, fuel gauges, pressure gauges and temperature gauges.

What is claimed is:

1. A meter comprising:
   a dial plate, the front of which defines a dial face;
   a pointer located on the front side of said dial plate, said pointer being made of a material pervious to light and having a root portion having a breadth smaller than the breadth of said dial face and an elongate pointer portion extending from said root portion, said root portion being formed with a cavity opening in the front surface of said root portion which faces away from the front side of said dial plate;
   a rotatable shaft extending through said dial plate for supporting said root portion of said pointer such that said pointer can swivel over said dial face;
   a hood member having a breadth smaller than the breadth of said dial face mounted on the front side of said dial plate, said hood member being substantially impervious to light and having a cap-like shade portion so shaped and positioned as to be spaced from and cover said front surface of said root portion of said pointer and a support portion extending from said shade portion to said dial face; and an electrical light source which is attached to said shade portion of said hood member so as to be disposed in said cavity in said root portion of said pointer;

said hood member including an electrical circuit for supplying electric current to said light source, said dial plate being provided with an electrical feeder circuit on the rear side thereof, said feeder circuit for supplying electric current to said electrical circuit, said hood member support portion being detachably secured to a central portion of said dial plate by a set of electrically conducting connectors such that said circuit of said hood member is connected to said feeder circuit by said connectors.

2. A meter according to claim 1, wherein said connectors comprise a combination of a pair of sleeve-like female terminals embedded in said dial plate so as to open in said dial face and a pair of metal pins which are partially inserted into said support portion of said hood member and tightly fit into said female terminals.

3. A meter according to claim 1, wherein said connectors comprise a combination of a pair of sleeve-like female terminals embedded in said support portion of said hood member so as to open in an end face of said hood member and a pair of metal pins which are partially inserted into said dial plate so as to protrude from said dial face and tightly fit into said female terminals.

4. A meter according to claim 1, wherein said connectors comprise two threaded metal rods, said support portion of said hood member being formed with a flange which extends substantially parallel to said dial plate and has two through holes, said threaded rods being inserted respectively into said two holes of said flange and protruding from the rear side of said dial plate.

5. A meter according to claim 1, wherein said light source comprises a light bulb.

6. A meter according to claim 5, wherein said shade portion of said hood member includes a disc-shaped portion which faces said front surface of said root portion of said pointer and is formed with a socket adapted to support said light bulb and a cylindrical wall extending from the periphery of said disc-like portion towards said dial face, said support portion being an axial extension of a circumferential a portion of said cylindrical wall.

* * * * *